Oct. 18, 1927.
J. J. LIPP
1,645,707
FOOTBALL LINEMAN'S APPARATUS
Filed Nov. 2, 1925
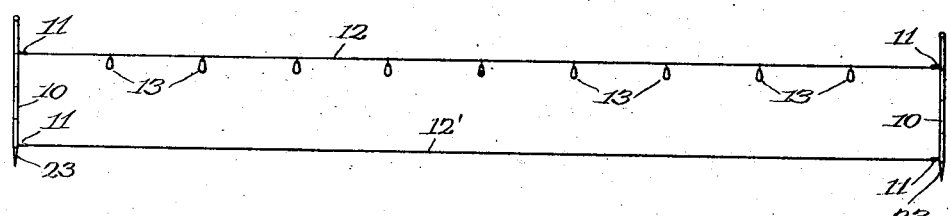
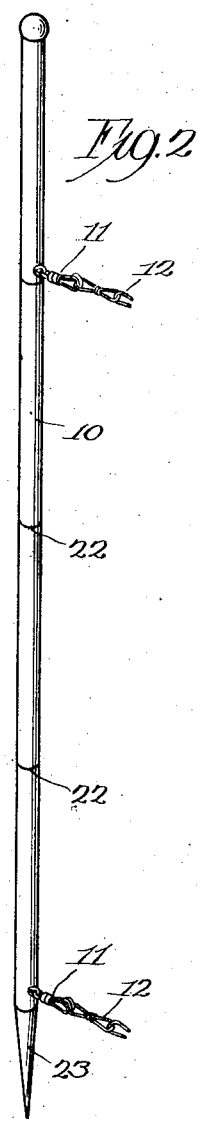
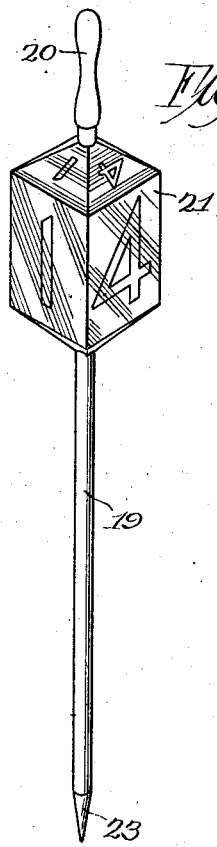
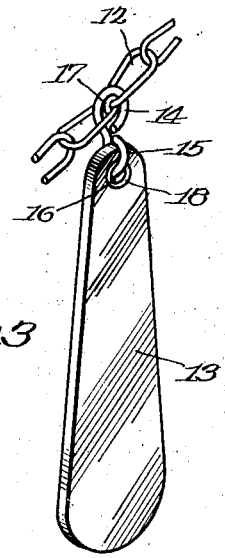
Inventor:
Julius J. Lipp Patented Oct. 18, 1927.

1,645,707

UNITED STATES PATENT OFFICE.

JULIUS J. LIPP, OF CHICAGO, ILLINOIS.

FOOTBALL LINEMAN'S APPARATUS.

Application filed November 2, 1925. Serial No. 66,290.

My invention relates to improvements to football linemen's apparatus, or the like.

The principal object of my invention is to provide apparatus having means for increasing the visibility of the measuring units thereof, whereby the referee or umpire, or other official can discern the distance gained, lost, or to be gained after each play more readily than is possible with the type of apparatus at present in common use.

Another more specific object is to provide said means in the form of markers, or targets of such size and color that the units of measurement of the apparatus are clearly distinguishable from a considerable distance.

A further object resides in so supporting the said markers or targets that in case they are made of thin material, one of the larger surfaces of each will always be in position to be seen from the field.

An additional object is to provide an improved down indicator.

Other objects relate to features of construction and arrangement of parts which will become apparent from a consideration of the following specification and accompanying drawings, wherein Fig. 1 is a vertical elevation of the linemen's chains.

Fig. 2 is an enlarged view of a portion thereof.

Fig. 3 is an enlarged view of one of the targets or markers, and

Fig. 4 is a perspective view of the down recorder.

In foot-ball linemen's apparatus, as at present commonly used, there is provided a pair of stakes joined by a pair of chains ten yards in length. This apparatus is handled by two men called "linemen", and is used to indicate the ground to be gained by the team carrying the ball. A "down" indicator also is usually employed in connection with the above mentioned apparatus, and consists of a rod or stake about three feet in length having a box-like enlargement adjacent the upper part thereof, said enlargement having its four vertical sides numbered 1 to 4, inclusive.

The operator turns the indicator a quarter rotation after each "down" to indicate to the field officials the number of the down, and he also moves the indicator along the previously described apparatus, in accordance with the distance gained or lost, whereby the referee can estimate the distance yet to be gained by the team carrying the ball.

It will be understood that the referee promptly announces the yardage to be gained after each play and that errors will very frequently be made for the reason that only an approximation of the gain or loss can be made with the present day type of apparatus, as distinguished from the quite definite reading of the distances where my apparatus is employed.

In the drawings, 10, 10, represent stakes, each having a pair of snaps 11, or other means, whereby the upper and lower chains 12 and 12', respectively, are attached thereto. The chains serve to space the stakes 10, 10, a distance of ten yards apart, although it will be obvious that if the invention is used in other relations, the length of the chains may be varied, as desired.

In the apparatus shown, which is intended for football use as at present played, nine markers or targets 13 are shown spaced a yard apart, thus dividing the chain into ten units. The targets 13 may be made of wood or metal and are preferably painted white or other distinctive color, whereby the same can readily be seen from a distance. Each marker is suspended from the upper chain by a fastening member 14 having a lower ring portion 15 passing through an opening 16 in the target 13, and an upper ring portion 17, which encircles the portion of the chain 13 which unites two successive loops or links thereof.

It will be seen that although this construction is not rigid in that it permits the marker to move somewhat in the plane of the chains 12 and 12', and at right angles thereto, the markers can not turn upon a vertical axis, and thus no marker can assume a position in which an edge only is exposed to view from the field. The targets are thus maintained in such position that the flat surfaces thereof will always be visible from the field when the apparatus is in position along a side line.

If the targets are made of wood or other fibrous material, the holes 16 are preferably reinforced by eyelets 18, as illustrated in Fig. 4. As shown in Fig. 1, the middle target is made readily distinguishable from the remaining targets, as by painting the same in two colors, thus facilitating the calculation of the distance to be made by the team carrying the ball.

In Fig. 4 is shown a "down" indicator comprising a rod or stake 19 having a handle 20 beneath which is provided a box 21 having its vertical faces numbered 1 to 4, inclusive. The upper surface of the box is pyramidal in form, and each of its triangular faces is numbered to correspond to the adjacent lower box face, as shown. The "down" indicator is turned to expose to the officials in the field the number corresponding to the last down, as will be understood. By providing the numbers on the pyramidal portion of the box 21, it can conveniently and readily be seen by the man who attends to the indicator, which member is exposed to view from the field.

It will be understood that the down indicator is moved along the chains 12 and 12' to a position opposite the ball after each down after the first, and that by the position of the indicator with reference to the targets 13 the distance to be gained and the number of the down can be seen at a glance.

For the purpose of rendering the apparatus distinctive, I prefer to paint the stakes 10 in two colors, which alternate in bands, as suggested by the dividing lines 22. The bottom of the stakes 10 and 19 are preferably provided with pointed metal ends 23, as shown.

Although I have shown certain features of my improvements for the purpose of illustration, it will be seen that changes may be made therein without departing from the spirit of the invention, and I do not wish to be restricted to the form shown and described except where limitations thereto appear in the appended claims.

What I claim is:

1. Apparatus of the class described, comprising a pair of end stakes, a pair of chains of predetermined length attached to and extending therebetween, said stakes and chains being arranged for disposal in the same vertical plane when in operative position, markers for indicating the division of one of said chains into measuring units, and means for attaching said markers to said chain to maintain said markers in the vertical plane of said chains and stakes.

2. Apparatus of the class described, comprising a pair of end stakes, a ten yard measuring member extending therebetween, and a plurality of colored markers attached to said member for indicating the divisions of the same into one yard units, the center one of said markers being differently colored for distinguishing the same from the other of said markers for facilitating the calculation of distance to one of said stakes from a point between the same.

3. Football linemen's apparatus, comprising a pair of end stakes, a member connecting said stakes near their bottom ends and adapted to space the same a predetermined distance apart, a second member connecting said stakes near their upper ends, and adapted to space the upper ends of said stakes substantially the same distance apart, and markers attached to said second mentioned member at spaced intervals for facilitating, from the football field, the calculation of distance to either of said stakes from a point between the same.

In testimony whereof, I have subscribed my name.

JULIUS J. LIPP.